(12) United States Patent
Grethel

(10) Patent No.: US 8,544,624 B2
(45) Date of Patent: Oct. 1, 2013

(54) HYDRAULIC CIRCUIT FOR CONTROLLING A HYBRID CLUTCH AND AN AUTOMATIC TRANSMISSION OF A MOTOR VEHICLE

(75) Inventor: Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1347 days.

(21) Appl. No.: 12/001,474

(22) Filed: Dec. 11, 2007

(65) Prior Publication Data

US 2008/0164115 A1 Jul. 10, 2008

Related U.S. Application Data

(60) Provisional application No. 60/874,201, filed on Dec. 11, 2006.

(51) Int. Cl.
*B60W 10/02* (2006.01)
*B60W 10/10* (2012.01)

(52) U.S. Cl.
USPC ...................... 192/3.58; 192/85.63

(58) Field of Classification Search
USPC ................ 192/3.51, 3.54, 3.55, 3.57, 3.58, 192/85.63

See application file for complete search history.

(56) References Cited

U.S. PATENT DOCUMENTS

| | | | | |
|---|---|---|---|---|
| 2,991,664 A | * | 7/1961 | Bernotas | 475/86 |
| 3,887,049 A | | 6/1975 | Ito et al. | 192/221 |
| 4,889,217 A | * | 12/1989 | Janiszewski et al. | 192/48.91 |
| 5,906,256 A | * | 5/1999 | Hayashi et al. | 192/83 |
| 6,527,074 B1 | * | 3/2003 | Morishita | 180/65.1 |
| 7,395,736 B2 | * | 7/2008 | Davidsson et al. | 74/665 F |

FOREIGN PATENT DOCUMENTS

| | | |
|---|---|---|
| GB | 1143793 | 2/1969 |
| GB | 2 166 098 A | 4/1986 |

* cited by examiner

*Primary Examiner* — David D Le
*Assistant Examiner* — Ryan Dodd
(74) *Attorney, Agent, or Firm* — Alfred J. Mangels

(57) ABSTRACT

A hydraulic circuit for controlling a hybrid clutch and an automatic transmission of a motor vehicle. The circuit includes an electrically-powered hydraulic pump to supply the hybrid clutch and the automatic transmission with a hydraulic medium. A pressure booster is connected downstream of the hydraulic pump and includes a pressure booster slave cylinder and a pressure booster master cylinder. A hydraulic line segment extends between the pressure booster and the hybrid clutch, with the pressure booster master cylinder connected with a hybrid clutch slave cylinder to actuate the hybrid clutch. An oil feed device is connected with the pressure booster slave cylinder and fed by it with the hydraulic medium for refilling the hydrostatic line segment with the hydraulic medium.

16 Claims, 3 Drawing Sheets

HYDRAULIC CIRCUIT FOR CONTROLLING A HYBRID CLUTCH AND AN AUTOMATIC TRANSMISSION OF A MOTOR VEHICLE

BACKGROUND OF THE INVENTION

1. Field of the Invention

The present invention relates to a hydraulic circuit for controlling a hybrid clutch and an automatic transmission of a motor vehicle, having an electrically operated hydraulic pump to supply the hybrid clutch and the automatic transmission with a hydraulic medium, a pressure booster connected downstream of the hydraulic pump, with a pressure booster slave cylinder and a pressure booster master cylinder, a hydraulic line segment connected between the pressure booster and the hybrid clutch, with the pressure booster master cylinder and a hybrid clutch slave cylinder, to actuate the hybrid clutch.

2. Description of the Related Art

Hydraulic circuits for motor vehicles are known and are employed for hydraulic actuation of motor vehicle components, for example of motor vehicles equipped with hybrid technology. To provide hydraulic energy or to circulate a hydraulic medium, an electrically operated hydraulic pump can be employed.

An object of the present invention is to provide an improved hydraulic circuit for controlling a hybrid clutch and an automatic transmission of a motor vehicle, in particular a hydraulic circuit including an electrically operated hydraulic pump that exhibits the lowest possible consumption of current.

SUMMARY OF THE INVENTION

The object is achieved with a hydraulic circuit for controlling a hybrid clutch and an automatic transmission of a motor vehicle, and having an electrically operated hydraulic pump to supply the hybrid clutch and the automatic transmission with a hydraulic medium. A pressure booster is connected downstream of the hydraulic pump and includes a pressure booster slave cylinder and a pressure booster master cylinder. A hydraulic line segment connects the pressure booster and the hybrid clutch, with the pressure booster master cylinder connected with a hybrid clutch slave cylinder to actuate the hybrid clutch. A feed device is provided and is attached to the pressure booster slave cylinder to feed it with the hydraulic medium, in order to refill the hydrostatic line segment with the hydraulic medium.

Advantageously, the pressure booster slave cylinder, which is part of a classic hydraulic circuit with flowing medium, is combined with a classic hydrostatic master-slave cylinder line segment for controlling the hybrid clutch. Advantageously, the pressure booster slave cylinder delivers the hydraulic medium to the feed device when there is a reset movement. That medium is then available to refill the hydrostatic line segment with the hydraulic medium. Advantageously, that makes it possible to dispense with a comparatively larger storage container for refilling the hydrostatic line segment. Advantageously, the need for hydraulic medium for refilling the hydrostatic line segment arises for exactly the length of time it takes the pressure booster slave cylinder to perform a reset movement, i.e., to deliver or pump the hydraulic medium into the assigned feed device, in particular without electrical energy being needed for that purpose to drive the electrically operated hydraulic pump.

The object is also achieved with a hydraulic circuit for controlling a hybrid clutch and an automatic transmission of a motor vehicle, and having an electrically operated hydraulic pump to supply the hybrid clutch and the automatic transmission with a hydraulic medium. A pressure booster is connected downstream of the hydraulic pump, with a pressure booster slave cylinder and a pressure booster master cylinder, a hydraulic line segment connected between the pressure booster and the hybrid clutch, with the pressure booster master cylinder and a hybrid clutch slave cylinder to actuate the hybrid clutch. An energy storage device is provided that can be connected into the circuit to store, receive, and/or feed in hydraulic energy. When operating the motor vehicle, it can be desirable to disengage the hybrid clutch as quickly as possible. Comparatively large quantities of hydraulic energy are required to achieve that result. Advantageously, at least part of the comparatively large but only briefly needed quantity of energy can be supplied by the connected energy storage device. That makes it possible to advantageously reduce peak power demands on the electrically operated hydraulic pump. In the ideal case, nearly constant electrical power consumption by the electrically operated hydraulic pump can be achieved. Advantageously, the electrically operated hydraulic pump can be designed comparatively smaller or less powerful. That applies both to the maximum possible transport volume and also to the maximum power consumption of an electrical drive source attached to the electrically operated hydraulic pump, for example an electric motor. In situations in which little or no power is needed by other hydraulic components of the hydraulic system, the connected energy storage device can be charged by the electrically operated hydraulic pump. Overall, comparatively economical use of electrical energy is possible.

The object is also achieved with a hydraulic circuit for controlling a hybrid clutch and an automatic transmission of a motor vehicle, and having an electrically operated hydraulic pump to supply the hybrid clutch and the automatic transmission with a hydraulic medium. A pressure booster is connected downstream of the hydraulic pump with a pressure booster slave cylinder and a pressure booster master cylinder. A hydraulic line segment is connected between the pressure booster and the hybrid clutch, with the pressure booster master cylinder and a hybrid clutch slave cylinder connected to actuate the hybrid clutch. A mechanically driven hydraulic pump is provided to supply the automatic transmission with the hydraulic medium. Conventional vehicles without hybrid components usually have automatic transmissions or multi-stage automatics with hydraulic actuation. Since those transmissions do not need any hydraulic actuation when the internal combustion engine is shut off, they normally have a mechanically driven hydraulic pump. It is possible to advantageously combine such an automatic transmission having hybrid components, in particular hydraulically actuated hybrid components, with an electrically operated hydraulic pump. When the internal combustion engine is shut off, and therefore the mechanically driven hydraulic pump is also shut off, the electrically operated hydraulic pump can advantageously take over supplying the automatic transmission with hydraulic energy, so that the hydraulic actuation system for the automatic transmission is functional even when the internal combustion engine is shut off. The electrically operated hydraulic pump thus takes over external supply of the automatic transmission with the hydraulic medium. Advantageously, that necessitates merely small modifications to already existing automatic transmissions. When the internal combustion engine is running, on the other hand, valuable electrical energy can be saved by operating the mechanically driven hydraulic pump.

Finally, the object is achieved with a hydraulic circuit for controlling a hybrid clutch and an automatic transmission of a motor vehicle, and having an electrically operated hydraulic pump to supply the hybrid clutch and the automatic transmission with a hydraulic medium. A pressure booster is connected downstream of the hydraulic pump, the booster including a pressure booster slave cylinder and a pressure booster master cylinder. A hydraulic line segment is connected between the pressure booster and the hybrid clutch, with the pressure booster master cylinder and a hybrid clutch slave cylinder connected to actuate the hybrid clutch. A heat exchanger is provided to dissipate waste heat from an electric motor of the electrically operated hydraulic pump into the hydraulic medium. Advantageously, the electric motor of the electrically operated hydraulic pump can be protected against overheating. To that end, the hydraulic medium can be passed completely through the heat exchanger before it is fed to the other components of the hydraulic circuit. In so doing, it can absorb the waste heat produced by the electrically operated hydraulic pump. To that end, the hydraulic medium can advantageously be routed past thermally relevant zones of the electrically operated hydraulic pump housing or of the electric drive, but without flooding the interior of the electric motor. The electric motor can advantageously be of smaller and more economical design.

Exemplary embodiments of the invention are distinguished by the fact that a first 4/3 directional proportional valve is provided, wherein in a first control position the electrically operated hydraulic pump is coupled with the pressure booster slave cylinder, in a second control position the electrically operated hydraulic pump is connected in parallel with the mechanically driven hydraulic pump, and in a third control position the mechanical and the electrically operated hydraulic pumps are connected in parallel and the pressure booster slave cylinder is connected to the oil feed device. The first proportional valve can have an electromagnetic actuating system and can assume intermediate positions. The first proportional valve is used to control different driving states of the motor vehicle that is equipped with the hybrid clutch.

In the first control position the pressure booster slave cylinder is charged with hydraulic energy delivered by the electrically operated hydraulic pump, so that the slave cylinder of the hybrid clutch is activated, i.e., the hybrid clutch is disengaged. In the second control position the pressure booster slave cylinder can also be supplied with hydraulic energy. In addition, however, the automatic transmission can also be supplied with hydraulic energy by means of the electrically operated hydraulic pump. In the third control position the automatic transmission can likewise be supplied with hydraulic energy. In contrast to the second control position, however, the pressure booster slave cylinder is connected with the oil feed device, i.e., it is quasi depressurized, so that the latter can reset. In addition, the electrically operated hydraulic pump is uncoupled from the hybrid clutch or from the pressure booster.

Other preferred exemplary embodiments of the invention are characterized by the fact that a check valve is connected between the electrical and the mechanically driven hydraulic pumps to prevent backflow from the mechanically driven hydraulic pump to the electrically operated hydraulic pump. Advantageously, it is thus guaranteed that when the automatic transmission is operated normally, i.e., when the internal combustion engine is turned on, no backflow of the hydraulic medium in the direction of the electrically operated hydraulic pump can occur. Advantageously, that also guarantees that the electrically operated hydraulic pump can be turned off if it is not needed, i.e., if the hybrid clutch is not disengaged, for example. Advantageously, that allows electrical energy for operating the electrically operated hydraulic pump to be saved.

Preferred exemplary embodiments of the invention are characterized by the fact that the feed device has an oil reservoir connected between the pressure booster slave cylinder and the hydrostatic line segment. The oil reservoir can be supplied with the hydraulic medium by the pressure booster slave cylinder. The oil reservoir functions advantageously as a store of hydraulic medium, which is needed for feeding or refilling the hydrostatic line segment. Advantageously, the oil reservoir can be of comparatively small design, since when needed, i.e., precisely when the hydrostatic line segment has to be refilled, that is, when there is a reset movement of the pressure booster slave cylinder, it is supplied with hydraulic medium by precisely that mechanism.

Preferred exemplary embodiments of the invention are characterized by the fact that the feed device includes an air separator connected between the oil reservoir and the pressure booster slave cylinder. For error-free functioning of the hydrostatic line segment, it must not contain any air or gas bubbles. The air separator ensures that only pure hydraulic medium, i.e., free of air, can be drawn into or added to the hydrostatic line segment via the downstream oil reservoir.

Other exemplary embodiments are characterized by the fact that the energy storage device has a disk spring storage device. Disk spring storage devices are economical to produce, and can store hydraulic medium against the reset force of the disk spring under a certain pressure.

Other exemplary embodiments of the invention are characterized by the fact that the energy storage device can be connected by way of a 2/2 directional valve. Through the 2/2 directional valve, a simple accumulator charging valve, preferably of so-called seated design, for example, the energy storage device can be connected to or disconnected from the rest of the hydraulic system as needed. In the disconnected state the energy storage device can store hydraulic energy. In the connected state there are basically two additional different conceivable modes of operation, namely the absorption of energy or the inputting of hydraulic energy. The feeding in of hydraulic energy can occur in phases of increased power need, and the removal in phases when power need is light.

Other exemplary embodiments of the invention are characterized by the fact that the energy storage device is switchable to a connecting line between the first proportional valve and the pressure booster by way of the 2/2 directional valve. Advantageously, when the 2/2 directional valve is open the energy storage device can deliver hydraulic energy directly into the pressure booster or into the pressure booster slave cylinder. That can be utilized advantageously to achieve a quick disengagement procedure of the hybrid clutch, for example.

Other exemplary embodiments of the invention are characterized by the fact that a second, 3/3 directional proportional valve is provided. In a first control position the energy storage device is uncoupled and the electrically operated hydraulic pump is connected with the first proportional valve, in a second control position the energy storage device and the electrically operated hydraulic pump are connected with the first proportional valve, and in a third control position the electrically operated hydraulic pump is connected with the energy storage device. The second proportional valve can thus perform the connecting or disconnecting of the energy storage device independent of the control position of the first proportional valve.

In the first control position the energy storage device is completely uncoupled, so that it cannot influence the rest of the hydraulic system. In the second control position the energy storage device and the electrically operated hydraulic pump are connected in parallel, so that they can jointly supply hydraulic energy to the rest of the hydraulic system, for example. In the third control position the electrically operated hydraulic pump and the energy storage device are connected, and the hydraulic energy storage device can be charged by means of the electrically operated hydraulic pump. Furthermore, in the third control position the electrically operated hydraulic pump and the energy storage device are completely separated from the rest of the hydraulic system. So it is possible to charge the energy storage device by means of the electrically operated hydraulic pump, without thereby influencing the rest of the hydraulic system through inevitably resulting pressure fluctuations or pressure patterns, for example.

Other exemplary embodiments of the invention are distinguished by the fact that the energy storage device for storing and/or absorbing hydraulic energy is connected in parallel with the electrically operated hydraulic pump. Through the parallel connection the energy storage device and the electrically operated hydraulic pump communicate with each other in such a way that the energy storage device automatically acts as a buffer; that is, it releases hydraulic energy during load peaks and absorbs hydraulic energy during low load phases. Pressure fluctuations that occur can also be damped advantageously with the help of the energy storage device.

Other exemplary embodiments of the invention are characterized by the fact that in the second control position of the second proportional valve the energy storage device releases hydraulic energy, if any has previously been stored. The energy storage device can advantageously absorb load peaks in that control position.

Other exemplary embodiments of the invention are distinguished by the fact that in the third control position of the second proportional valve the energy storage device absorbs hydraulic energy supplied by the electrically operated hydraulic pump. The energy storage device can advantageously be recharged in this control position.

The object of the invention is also achieved with a motor vehicle having a hydraulic circuit as set forth above.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
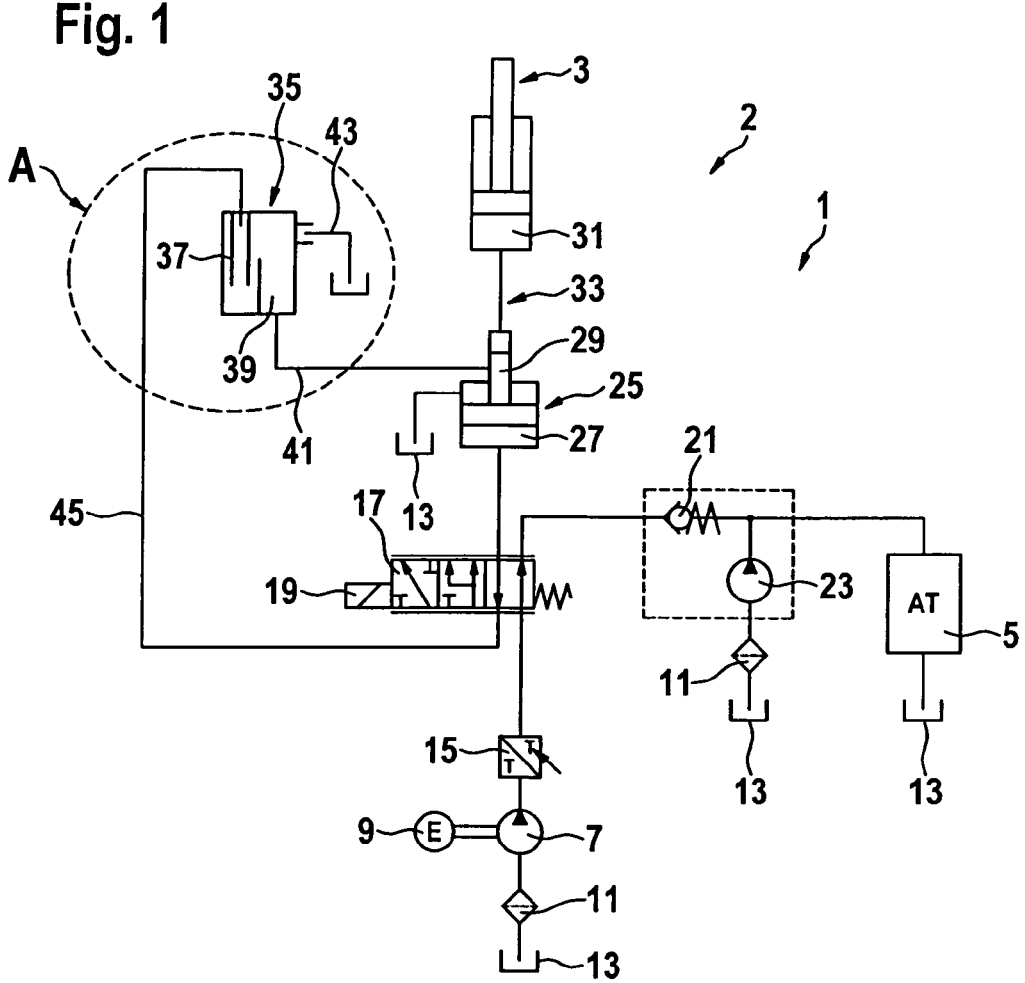
FIG. 1 is a motor vehicle hydraulic circuit diagram for controlling a hybrid clutch and an automatic transmission and including a feed device.

FIG. 1 shows a hydraulic circuit 1 of a motor vehicle 2 for controlling a hybrid clutch 3 and an automatic transmission 5 of the motor vehicle. The hydraulic circuit 1 includes an electrically driven hydraulic pump 7 that is driven by an electric motor 9 that is operatively connected to the hydraulic pump 7. Hydraulic pump 7 is connected to a tank 13 through a suction filter 11. Tank 13 stores a hydraulic medium, for example an appropriate hydraulic oil. A heat exchanger 15 is connected downstream of the electric motor 9 to cool it. Heat exchanger 15 can be designed so that the hydraulic medium transported by hydraulic pump 7 passes around electric motor 9 to cool it, especially at locations of particular thermal loading.

The hydraulic medium transported by hydraulic pump 7 is able to absorb the waste heat produced by electric motor 9. Connected downstream of hydraulic pump 7 and heat exchanger 15 is a first proportional valve 17. First proportional valve 17 is designed as a 4/3 directional valve with an electromagnetic actuation system 19. First proportional valve 17 is designed to control the other components of the hydraulic circuit 1.

Connected downstream of first proportional valve 17 are automatic transmission 5 and hybrid clutch 3. To uncouple automatic transmission 5 from electrically operated hydraulic pump 7, a check valve 21 is connected downstream of first proportional valve 17, which prevents a backflow of hydraulic medium coming from automatic transmission 5. To supply automatic transmission 5 with the hydraulic medium, a mechanically driven hydraulic pump 23 is provided, which is likewise supplied with the hydraulic medium from tank 13 through a suction filter 11.

Mechanically driven hydraulic pump 23 is connected in parallel with electrically operated hydraulic pump 7 through first proportional valve 17. However, check valve 21 prevents an overflow of hydraulic medium in the direction of electrically operated hydraulic pump 7. Check valve 21 ensures that when electrically operated hydraulic pump 7 is shut off or disconnected, for example, the automatic transmission 5 can be supplied with the hydraulic medium in the conventional manner, i.e., by way of mechanically driven hydraulic pump 23. But when hydraulic pump 23 is shut off, i.e., when the internal combustion engine of motor vehicle 2 is shut off, for example, automatic transmission 5 can be supplied with the hydraulic medium as check valve 21 is opened by means of hydraulic fluid delivered by electrically operated hydraulic pump 7.

A pressure booster 25 is connected downstream of first proportional valve 17. Pressure booster 25 includes a pressure booster slave cylinder 27 and a pressure booster master cylinder 29. Pressure booster slave cylinder 27 can be filled with the hydraulic medium by means of electrically operated hydraulic pump 7. A difference in areas of pressure booster slave cylinder 27 and pressure booster master cylinder 29 results in a higher pressure level on the master cylinder side of pressure booster 25, pressure booster master cylinder 29 having a smaller area than pressure booster slave cylinder 27. The correspondingly higher pressure level is necessary to actuate a hybrid clutch slave cylinder 31 of hybrid clutch 3.

Advantageously, the pressure intensification ratio of pressure booster 25 can be designed so that the requisite pressure at the pressure booster slave cylinder to disengage the hybrid clutch is approximately at the pressure level of automatic transmission 5. It is therefore possible to advantageously design electrically operated hydraulic pump 7 for a comparatively low pressure level, and nevertheless for it to supply hybrid clutch 3 and automatic transmission 5 equally with hydraulic energy. That makes it possible to save valuable electrical energy for operating electrically operated hydraulic pump 7 by eliminating pressure reducing units that might be necessary, for example.

Pressure booster master cylinder 29 and hybrid clutch slave cylinder 31 are connected by a hydrostatic line segment 33. As pressure booster slave cylinder 27 retracts, the hydrostatic line segment 33 has to be refilled with the hydraulic medium. To that end, a feed device 35 is connected to pressure booster 25 or to hydrostatic line segment 33. Feed device 35 includes an air separator 37 and an oil reservoir 39. Advantageously, air separator 37 and oil reservoir 39 are filled with the hydraulic medium by pressure booster master cylinder 29 as the latter retracts. Oil reservoir 39 is connected via a feeder line 41 to the hydrostatic line segment 33 to refill it. Advantageously, the hydrostatic line segment 33 must be refilled as pressure booster master cylinder 29 retracts, oil reservoir 39 being filled constantly with the hydraulic medium during the retraction. Excess hydraulic medium can be returned from oil reservoir 39 to tank 13 through a tank line 43.

Figure 2:
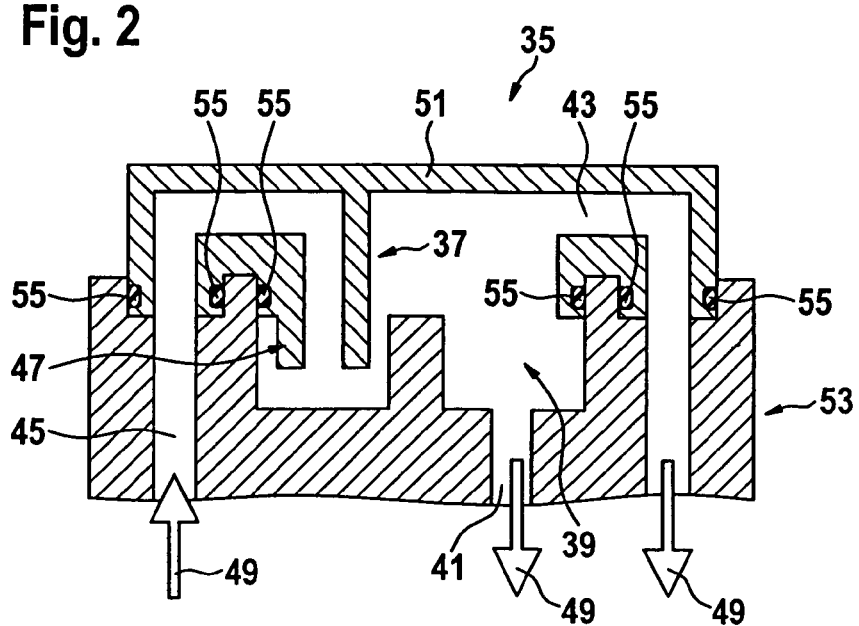
FIG. 2 is a cross-sectional view of the feed device shown schematically in FIG. 1.

FIG. 2 shows a detailed cross-sectional view of the feed device shown schematically in FIG. 1, with the detail designated in FIG. 1 by a dashed circle identified as A. Feed device 35 is supplied with the hydraulic medium through a return line 45, whereby the return line 45 can be connected to pressure booster slave cylinder 27 through first proportional valve 17.

Return line 45 opens into air separator 37. Air separator 37 includes an air separator nozzle 47 and the oil reservoir 39, which also prevents air from entering the feed line 41. Air that can be found in the hydraulic medium can be fed to tank 13 through tank line 43, which is on top as seen in the orientation of FIG. 2. The respective directions of flow in lines 41, 43, and 45 are indicated by arrows 49.

Feed device 35 includes a hydraulic housing 53 that is closed by a cover 51. Seals 55 are provided to seal the cover 51 to hydraulic housing 53.

First proportional valve 17 can assume three control positions, whereby electrically operated hydraulic pump 7 is connected with pressure booster slave cylinder 27 in a first control position. In that control position electrically operated hydraulic pump 7 can supply pressure booster slave cylinder 27 that operates pressure booster master cylinder 29 to supply the hydraulic medium through hydrostatic line segment 33, which ultimately brings about a disengagement of hybrid clutch 3. Hybrid clutch 3 can be a normally-closed or a normally-open clutch. In a second control position of first proportional valve 17, automatic transmission 5 is additionally connected to electrically operated hydraulic pump 7 through check valve 21. Thus, in the second control position, in addition to supplying pressure booster slave cylinder 27 with the hydraulic medium, automatic transmission 5 is also supplied with the hydraulic medium that is delivered by electrically operated hydraulic pump 7. That control condition is significant when the internal combustion engine is shut off and hybrid clutch 3 is disengaged, for example. Advantageously, automatic transmission 5 can be supplied hydraulically and therefore controlled despite the internal combustion engine of motor vehicle 2 being shut off. In a third control position of proportional valve 17, which is the position shown in FIG. 1, only automatic transmission 5 is connected downstream of electrically operated hydraulic pump 7, so that it can be supplied by the latter with hydraulic energy. Furthermore, in the third control position pressure booster slave cylinder 27 is connected with feed device 35 through return line 45, so that the refilling of hydrostatic line segment 33 can take place in that third control position of first proportional valve 17.

Figure 3:
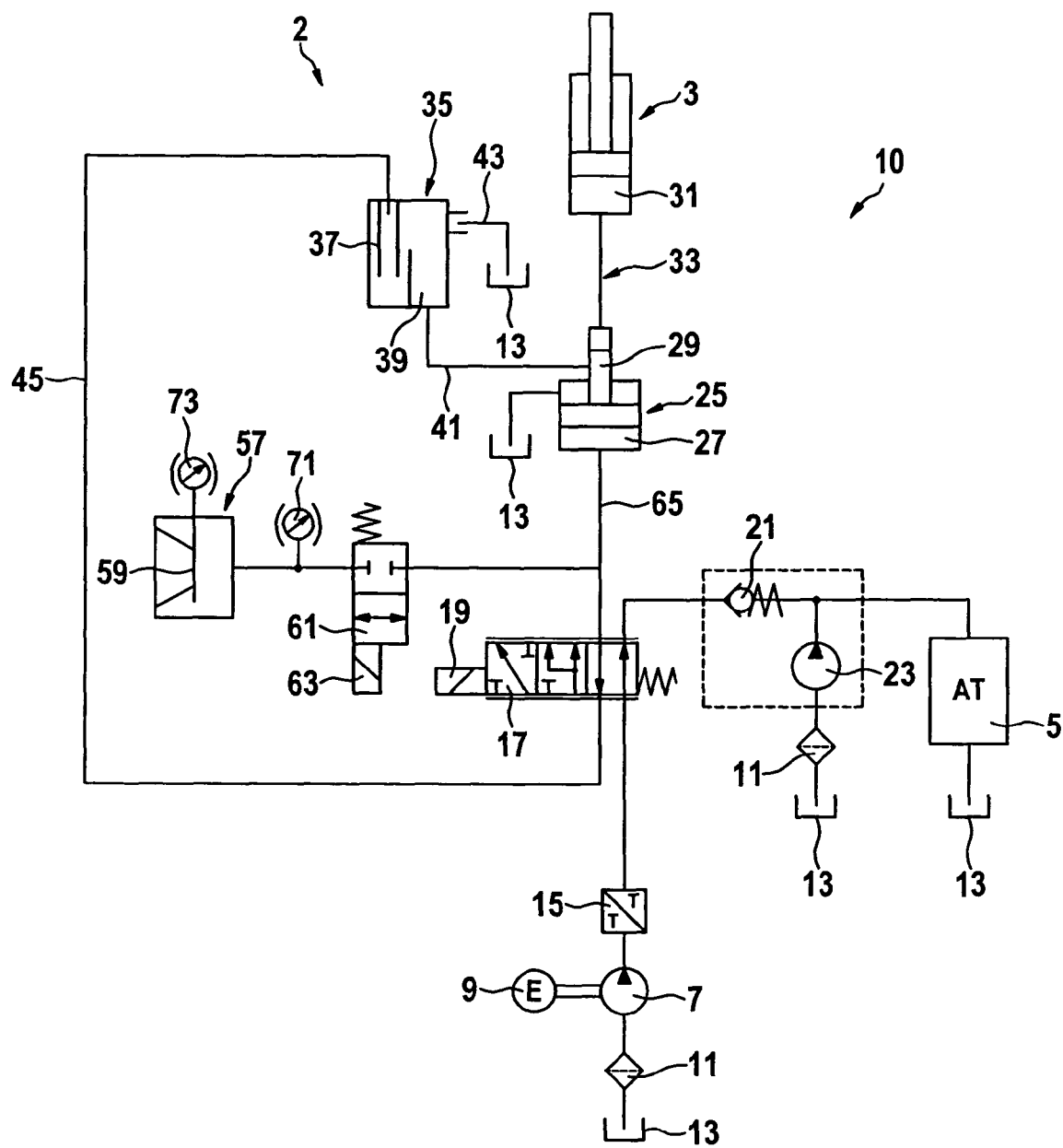
FIG. 3 is a circuit diagram of another hydraulic circuit, but having an additional energy storage device in comparison to the hydraulic circuit in FIG. 1.

FIG. 3 shows another hydraulic circuit 1 for controlling hybrid clutch 3 and automatic transmission 5 of motor vehicle 2. In contrast, hydraulic circuit 10 in accordance with FIG. 3 includes an energy storage device 57 including a disk spring storage element 59. Energy storage device 59 can be connected to the rest of the hydraulic system or disconnected from it through a 2/2 directional valve 61. The 2/2 directional valve 61 includes an electrical actuation system 63 with spring reset. Energy storage device 57 can be connected to a connecting conduit 65 through the 2/2 directional valve 61. Connecting conduit 65 joins pressure booster slave cylinder 27 and first proportional valve 17. When the 2/2 directional valve 61 is open, energy storage device 57 or disk spring storage element 59 can absorb or release hydraulic energy. Advantageously, the 2/2 directional valve 61 can be opened in the second control position of first proportional valve 17, for example, during which disk spring storage element 59 can release or absorb stored hydraulic energy for the disengagement process of hybrid clutch 3. In the first control position of first proportional valve 17, energy storage device 57 can likewise be supplied with hydraulic energy or can release hydraulic energy by means of electrically operated hydraulic pump 7.

Figure 4:
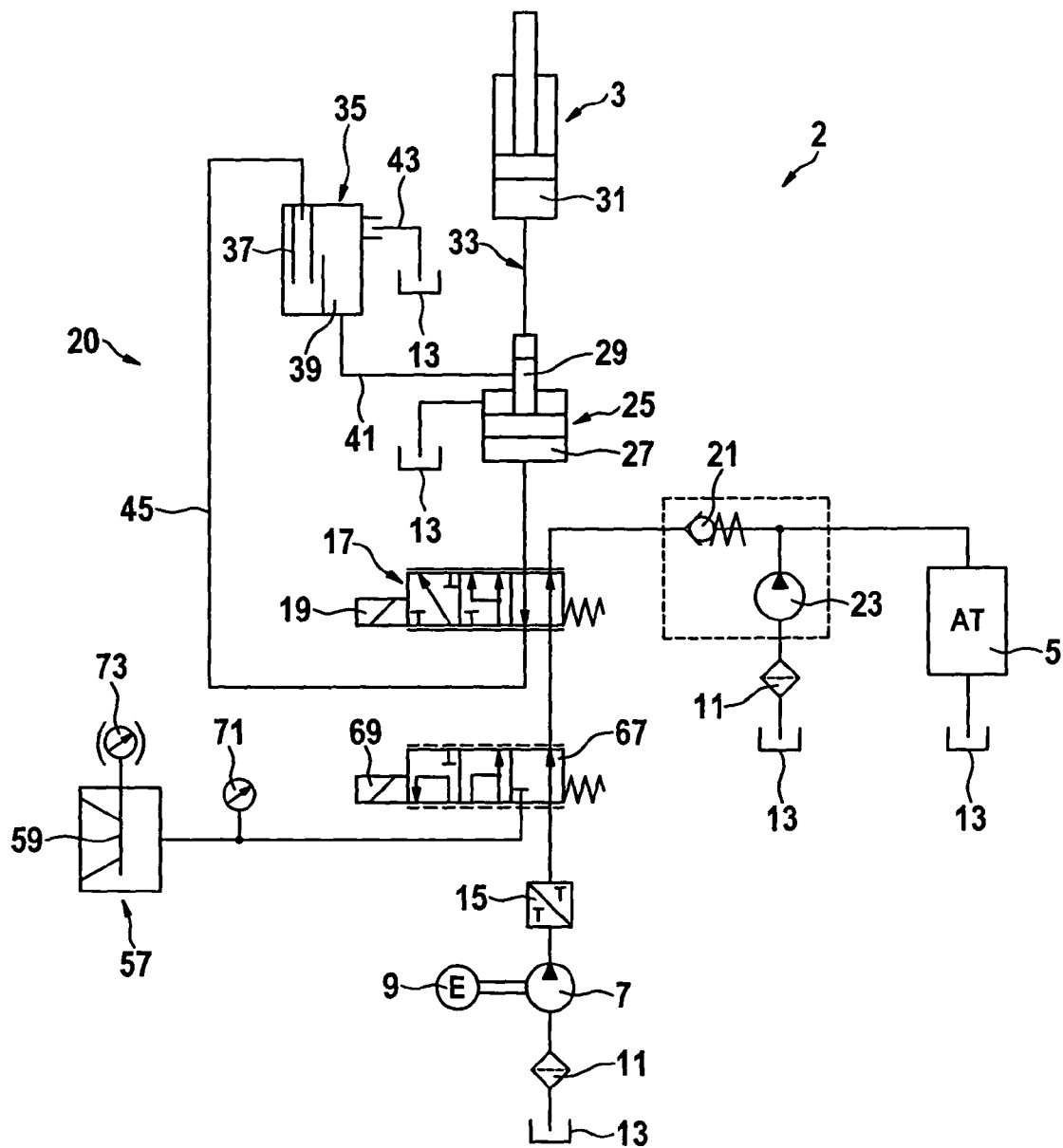
FIG. 4 is a circuit diagram of another hydraulic circuit, wherein the energy storage device is connected to the circuit through an additional proportional valve.

FIG. 4 shows another hydraulic circuit 20, where in contrast to the hydraulic circuit 10 in accordance with FIG. 3 a second proportional valve 67 with an electrical actuation system 69 with spring resetting is provided. Second proportional valve 67 can advantageously select the various operating states of the disk spring storage element 59 of energy storage device 57, independent of the control position of first proportional valve 17. At the same time, in a first control position, which is shown in FIG. 4, energy storage device 57 is completely uncoupled from the rest of the hydraulic system. In addition, electrically operated hydraulic pump 7 is then connected with first proportional valve 17. In this respect, in that control position the functionality of hydraulic circuit 1 explained in FIG. 1 is the result.

In a second control position of second proportional valve 67, electrically operated hydraulic pump 7 is additionally connected with energy storage device 57. In that control position disk spring storage element 59 of energy storage device 57 can in addition feed stored hydraulic energy into the downstream hydraulic system, for example, or it can absorb pump output.

In a third control position both the disk spring storage element 59 of energy storage device 57 and the electrically operated hydraulic pump 7 are uncoupled from the rest of the hydraulic system. Moreover, they are connected with each other in that third control position. In the third control position the disk spring storage element 59 of energy storage device 57 can thus be supplied with hydraulic energy by means of the electrically operated hydraulic pump 7.

The load state of disk spring storage element 59 can be monitored by means of a pressure sensor 71, for example. Alternately, or additionally, the load state can also be monitored by means of a distance sensor 73. The charging process and/or the control position of second proportional valve 67 can be controlled and/or regulated depending upon the feedback from pressure sensor 71 and/or from distance sensor 73. To that end, it is conceivable, for example, that as soon as an adequate load state of the disk spring storage element 59 has been reached, to throttle and/or shut off the electric motor 9 of electrically operated hydraulic pump 7 accordingly, and/or to change the control condition of second proportional valve 67 accordingly.

The pressure booster master cylinder 29 of pressure booster 25 fulfills the function of a master cylinder for hybrid clutch 3. In addition, the classic hydrostatic line segment 33 is advantageously connected with the hydraulic circuit fed by the electrically operated hydraulic pump 7 to actuate hybrid clutch 3. Advantageously, that makes it possible to get along without a comparatively large container tank for refilling the hydrostatic line segment 33. Advantageously, the function of oil feeding or oil refilling is assumed by feed device 35, which ensures when hybrid clutch 3 is in the non-actuated position that the hydrostatic line segment 33 can be refilled, for example vacuum-filled. Advantageously, in normal operation a corresponding feed bore of pressure booster master cylinder 29 is connected to the oil reservoir 39 in the hydraulic housing 53 of feed device 35, which is small in relation to conventional storage containers.

That ensures that there is always sufficient hydraulic medium or oil present in the oil reservoir 39. Advantageously, to that end, the hydraulic medium that flows back from pressure booster 25 during retraction can be routed past the oil reservoir 39 to the tank 13 or to an appropriate oil sump. In that case the returning hydraulic medium is conducted to the oil reservoir in such a way that no hydraulic medium mixed with air is present in the region of the feed line 41. That is especially important in order for the hydrostatic line segment 33 to function reliably. Air separator 37 has basically two functional parts to that end, namely the oil reservoir 39 integrated into the control block or a reallocation area, and the cover 51 with the air separator nozzle 47. The hydrostatic line segment 33 can also be vacuum filled conventionally through an additional filling cover that tightly seals the return line 45 and the tank line 43.

For the cases when the internal combustion engine of motor vehicle 2, and hence the mechanically driven hydraulic pump 23 of automatic transmission 5, are not running, automatic transmission 5 must be supplied with the hydraulic medium externally. To avoid expensive changes to the hydraulic control of automatic transmission 5, it is possible advantageously to modify only slightly a housing of mechanically driven hydraulic pump 23. Advantageously, that modification can consist in the housing receiving an additional connection at an outflow region, through which the hydraulic medium supplied by the electrically operated hydraulic pump 7 can reach the hydraulic control of automatic transmission 5 via the identical route as in the normal case. To ensure that the functioning of the hydraulic control is not influenced in operating situations that lack the external supply by means of the electrically operated hydraulic pump 7, check valve 21 can be provided, which prevents the hydraulic medium from the mechanically driven hydraulic pump 23 from flowing back in the direction of electrically operated hydraulic pump 7.

When operating electrically operated hydraulic pump 7, the heat exchanger 15 can advantageously be provided to protect from overheating for operating conditions of electric motor 9 with comparatively high development of waste heat. Advantageously, by means of heat exchanger 15, electric motor 9 can be cooled in the thermally relevant region of the housing by the hydraulic medium from the stream conveyed by electrically operated hydraulic pump 7, but without flowing into the interior of electric motor 9. Heat exchanger 15 can be integrated directly onto the hydraulics block. The hydraulic medium supplied by electrically operated hydraulic pump 7 can be routed completely through heat exchanger 15 before it is supplied to the subsequent valve function.

Electric power peaks caused by the disengagement of hybrid clutch 3 can be reduced advantageously. To that end, in the disengagement situation the flow volume provided by electrically operated hydraulic pump 7 can be supported by an additional volumetric flow source, namely the disk spring storage element 59 of energy storage device 57. That allows the size of electrically operated hydraulic pump 7 to be reduced advantageously. Therefore, the maximum requisite electrical power can be reduced and brought closer to the other load points. Charging of energy storage device 57 can take place in situations in which little or no power is needed by the other consumers.

The disk spring storage element 59 of energy storage device 57 can be connected in parallel between first proportional valve 17 and pressure booster 25—i.e., in connecting conduit 65. Through the 2/2 directional valve 61, which can be designed as a simple accumulator charging valve, for example, preferably of so-called seated design, energy storage device 57 is connected to or disconnected from the rest of the hydraulic system. When hybrid clutch 3 is disengaged, charged energy storage device 57 is connected to the rest of the hydraulic system and empties out, thereby supporting the disengagement process. Once the disengagement process of hybrid clutch 3 is concluded, a main spool of first proportional valve 17 remains in its position until energy storage device 57 is recharged. The charging process can be monitored either by pressure sensor 71 and/or by distance sensor 73. The 2/2 directional valve 61 can be closed after the charging process is complete.

In accordance with the hydraulic circuit shown in FIG. 4, energy storage device 57 can be actuated independently of the position of first proportional valve 17. The load state of energy storage device 57 can be monitored constantly. Advantageously, energy storage device 57 can be recharged independently if the energy needs of the rest of the hydraulic system so permit. It can thus be advantageously ensured that sufficient hydraulic energy is present in energy storage device 57 before each disengagement process of hybrid clutch 3.

Another advantage is that the flow volume of energy storage device 57 and the flow volume of electrically operated hydraulic pump 7 can be regulated jointly through first proportional valve 17.

All-in-all, possibilities result for hydraulic actuation of hybrid clutch 34 and of automatic transmission 5 of motor vehicle 2, while especially little electrical energy needs to be expended to produce hydraulic energy.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic circuit for controlling a hybrid clutch and an automatic transmission of a motor vehicle, said circuit comprising: an electrically driven hydraulic pump to supply the hybrid clutch and the automatic transmission with a hydraulic medium; a pressure booster connected downstream of the hydraulic pump and including a pressure booster slave cylinder and a pressure booster master cylinder; a hydrostatic line segment connected between the pressure booster and the hybrid clutch and extending from the pressure booster master cylinder to a hybrid clutch slave cylinder to actuate the hybrid clutch; and an oil feed device having an oil reservoir to provide hydraulic medium to refill the hydrostatic line segment with the hydraulic medium; wherein the electrically driven pump is selectively operatively connected with the hybrid clutch and with the automatic transmission through a flow control valve.

2. A hydraulic circuit in accordance with claim 1, including an energy storage device in fluid communication with the electrically operated hydraulic pump for storing, absorbing, and supplying hydraulic pressure to the hydraulic circuit.

3. A hydraulic circuit in accordance with claim 1, including a mechanically driven hydraulic pump for supplying the automatic transmission with the hydraulic medium.

4. A hydraulic circuit in accordance with claim 1, including a heat exchanger for transferring waste heat of an electric motor of the electrically operated hydraulic pump into the hydraulic medium.

5. A hydraulic circuit in accordance with claim 3, wherein the flow control valve is a 4/3 directional proportional valve connected between the electrically operated hydraulic pump and the pressure booster, wherein in a first control position of the 4/3 directional proportional valve the electrically operated hydraulic pump is coupled with the pressure booster slave cylinder; wherein in a second control position of the 4/3 directional proportional valve the electrically operated hydraulic pump is connected in parallel with the mechanically driven hydraulic pump for providing pressurized hydraulic medium to the hybrid clutch and to the automatic transmission; and wherein in a third control position of the 4/3 directional proportional valve the mechanically driven hydraulic pump and the electrically operated hydraulic pump are connected in parallel for providing pressurized hydraulic medium to the automatic transmission; and the pressure booster slave cylinder is connected to the oil feed device.

6. A hydraulic circuit in accordance with claim 3, including a check valve connected between the electrically operated hydraulic pump and the mechanically driven hydraulic pump to prevent backflow from the mechanically driven hydraulic pump to the electrically operated hydraulic pump.

7. A hydraulic circuit in accordance with claim 1, wherein the oil feed device includes an oil reservoir connected to one of the pressure booster and the hydrostatic line segment.

8. A hydraulic circuit in accordance with claim 1, wherein the oil feed device includes an air separator that is connected between the oil reservoir and the pressure booster slave cylinder.

9. A hydraulic circuit in accordance with claim 2, wherein the energy storage device includes a disk spring storage element.

10. A hydraulic circuit in accordance with claim 2, wherein the energy storage device is connected to the hydraulic circuit through a 2/2 directional valve.

11. A hydraulic circuit in accordance with claim 10, wherein the energy storage device is connected between the flow control valve and the pressure booster through the 2/2 directional valve.

12. A hydraulic circuit in accordance with claim 2, wherein the flow control valve is a 3/3 directional proportional valve connected between the electrically operated hydraulic pump and the pressure booster, wherein in a first control position of the 3/3 directional proportional valve the energy storage device is uncoupled from the circuit and the electrically operated hydraulic pump is connected with a 4/3 directional proportional valve; wherein in a second control position of the 3/3 directional proportional valve the energy storage device and the electrically operated hydraulic pump are each connected with the 4/3 directional proportional valve; and wherein in a third control position of the 3/3 directional proportional valve the electrically operated hydraulic pump is connected with the energy storage device.

13. A hydraulic circuit in accordance with claim 2, wherein the energy storage device is operatively connected with the electrically operated hydraulic pump through a 3/3 directional proportional valve to store and absorb hydraulic energy from the electrically operated hydraulic pump.

14. A hydraulic circuit in accordance with claim 12, wherein in the second control position of the 3/3 directional proportional valve the energy storage device releases stored hydraulic energy to the hydraulic circuit.

15. A hydraulic circuit in accordance with claim 12, wherein in the third control position of the 3/3 directional proportional valve the energy storage device receives hydraulic energy that is supplied by the electrically operated hydraulic pump.

16. A motor vehicle having a hydraulic circuit in accordance with claim 1.

* * * * *